United States Patent [19]

Iwasa

[11] Patent Number: 4,929,490
[45] Date of Patent: May 29, 1990

[54] WINDOW FRAME RUBBER MOLDINGS FOR AUTOMOBILE

[75] Inventor: Tadanobu Iwasa, Ichinomiya, Japan

[73] Assignee: Toyoda Gosei Co., Ltd., Nishikasugai, Japan

[21] Appl. No.: 302,265

[22] Filed: Jan. 27, 1989

[30] Foreign Application Priority Data

Mar. 18, 1988 [JP]  Japan .................... 63-066530

[51] Int. Cl.⁵ ..................... B60J 1/20; E06B 7/14
[52] U.S. Cl. ........................ 428/195; 49/475;
  49/485; 49/490; 49/498; 296/93; 428/31;
  428/68; 428/76; 428/122; 428/913
[58] Field of Search ............ 296/93; 49/475, 485,
  49/498, 490; 428/122, 913, 195, 68, 76, 31

[56] References Cited

U.S. PATENT DOCUMENTS

| 2,055,833 | 7/1935 | Bailey | 428/122 |
| 2,599,717 | 2/1948 | Bailey | 428/122 |
| 2,610,714 | 11/1951 | Bradley | 428/122 |
| 3,706,628 | 12/1970 | Azzola | 428/122 |
| 4,603,899 | 8/1986 | Iwasha | 428/122 |
| 4,708,351 | 11/1987 | Midooka et al. | 428/122 |
| 4,783,931 | 11/1988 | Kirkwood | 428/122 |

FOREIGN PATENT DOCUMENTS 3426814 11/1985 Fed. Rep. of Germany ...... 428/122

Primary Examiner—Ellis P. Robinson
Assistant Examiner—Archene A. Turner
Attorney, Agent, or Firm—Cushman, Darby & Cushman

[57] ABSTRACT

This invention is directed to a window frame rubber molding for an automobile, whose main body incorporates an automobile body flange retaining groove and a glass retaining groove opening in the mutually opposite directions and possessing an approximately S-shaped cross section. The flange retaining groove is provided in the bottom wall thereof with a strand retaining groove converged in the direction of the opening thereof and the strand retaining groove has fitted therein a strand impregnated with rustproofing agents.

2 Claims, 1 Drawing Sheet

WINDOW FRAME RUBBER MOLDINGS FOR AUTOMOBILE

BACKGROUND OF THE INVENTION

This invention relates to window frame rubber moldings for an automobile. The term "window frame rubber moldings" as used herein means the rubber strips which are fitted to the edges of such stationary window glasses as a windscreen and a rear window and quarter windows in an automobile so as to protect the automobile interior against wind, rain, dust, noise, cold, and heat prevailing in the ambience.

In the present specification, this invention will be described with reference typically to a main body 5 of a window frame rubber molding which, as illustrated in FIGS. 1 and 2, incorporates therein a flange retaining groove 1 and a glass retaining groove 3 opening in mutually opposite directions and possesses an approximately S-shaped cross section. The window frame rubber moldings contemplated by the present invention are not limited to this construction.

The main body 5 of a window frame rubber molding is generally produced by extrusion molding with a rubber compound such as ethylene-propylene rubbers (EPDM, EPM) or chloroprene rubber (CR) or an elastomer material such as thermoplastic elastomers.

With the main body 5 of the window frame rubber molding formed as described above, it has been customary for a given glass sheet G to be secured to an automobile body by causing the main body 5 to be joined to the glass sheet G with the glass retaining groove 3 taking fast hold of the edge of the glass sheet G and then causing the flange retaining groove 1 to be fitted on an automobile body flange 11 with the opening side of the flange retaining groove 1 spread out by a pull at a groove spreading cord 7 fixed in advance in the flange retaining groove 1 (FIG. 1).

Owing partly, if not wholly, to the increasingly prevailing practice of spraying an antifreeze agent (common salts in most cases) on road surfaces during the winter season, the automobile body flange 11 inserted in the flange retaining groove 1 has been urged to possess higher rustproofing properties than ever.

As a solution, there may be conceived an idea of filling the bottom part of the flange retaining groove with a sealant made of a macromolecular material incorporating therein a rustproofing agent in combination with a highly absorbent polymer as disclosed in the specification of Japanese Utility Model Application Disclosure SHO 62(1987)-68,850, for example. In the case of the window frame rubber molding of the aforementioned type, however, this idea is substantially impracticable because the sealant cannot be easily extruded simultaneously in a desired part and the die head to be used for the extrusion gains immensely in intricacy.

There may be conceived another idea of filing the bottom part with a nondrying sealant after the main body has been vulcanization molded. This idea is substantially infeasible because when the cord inserted in the flange retaining groove is pulled during the attachment of the main body of window frame rubber molding to the automobile body, the sealant adheres to the cord and impairs the efficiency of the work of attachment in a large measure.

SUMMARY OF THE INVENTION

In view of the true state of prior art described above, this invention aims to provide a window frame rubber molding for an automobile, which manifests a highly desirable rustproofing effects on an automobile body flange.

The window frame rubber molding of the present invention accomplishes the object by the following construction.

Specifically, the invention is directed to a window frame rubber molding for an automobile, comprising a main body incorporating therein an automobile body flange retaining groove and a glass retaining groove opening in mutually opposite directions and possessing an approximately S-shaped cross section, which window frame rubber molding is characterized by the fact that the flange retaining groove is provided in the bottom wall thereof with a strand retaining groove converged in the direction of the opening thereof and the strand retaining groove has fitted therein a strand impregnated with a rustproofing agents. Owing to the construction described above, when the window frame rubber molding already attached to the automobile body suffers moisture or water to seep into the flange retaining groove incorporating therein the strand impregnated with rustproofing agents the flange part, specifically the leading end of the flange part particularly susceptible to rusting, is infallibly protected with the rustproofing agents because the strand impregnated with the rustproofing agents exude the rustproofing agents as it absorbs the incoming water. The window frame rubber molding of the present invention, therefore, manifests highly desirable rustproofing effects on the automobile body flange for a long time.

DESCRIPTION OF THE PREFERRED EMBODIMENTS

Figure 1:
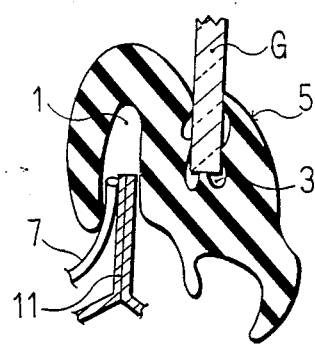
FIG. 1 is a cross section illustrating the conventional window frame rubber molding in process of attachment to an automobile body.
Figure 2:
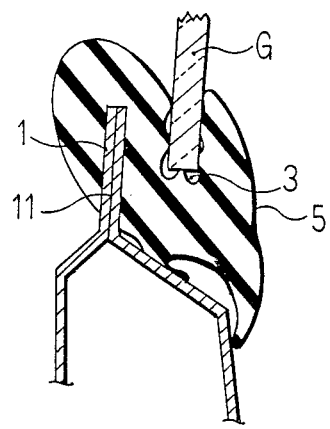
FIG. 2 is a cross section illustrating the same rubber molding already in position on the automobile body.

Now, the present invention will be described below with reference to illustrated embodiments. In the drawings, the parts equal to those already mentioned above will be denoted by equal reference numerals and their explanations will be partly omitted.

Figure 3:
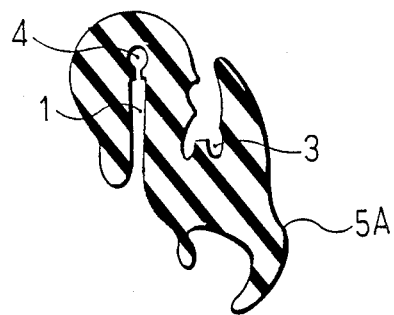
FIG. 3 is a cross section of the same window frame rubber molding prior to incorporation therein of a strand impregnated rustproofing agents.

(1) In a window frame rubber molding identical in construction to the conventional counter type as illustrated in FIG. 3, a flange retaining groove 1 is provided in the bottom wall thereof with a stand retaining groove 4 which is converged in the direction of the opening thereof. This strand retaining groove 4 can be easily obtained by suitably shaping an extruding die to be used for the extrusion molding of the main body 5A of window frame rubber molding.

Figure 4:
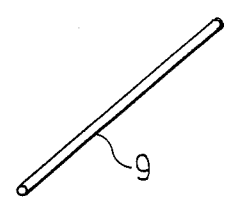
FIG. 4 is a perspective view of a typical strand impregnated with rustproofing agents and used for this invention.

(2) FIG. 4 is a partial perspective view illustrating a typical strand 9 impregnated with rustproofing agents to be used in the present invention.

The matrix of this strand is only required to be impregnable with rustproofing agents and suitably flexible. It is not discriminated on account of shape and material. The cross-sectional shape of the strand need not be limited to a circle but may be a triangle or a rectangle (which particularly fits a matrix to obtained by being cut from a fabric material) instead, for example. The texture of the strand, for the sake of the ease of impregnation, is desired to be something like felt or nonwoven fabric which is obtained by intertwining fibers by a mechanical or chemical action in an inseparable manner. The material of these fibers may be a polyolefin or a polyester, for example.

The strand impregnated with a rustproofing agent is produced by impregnating the strand matrix with a varying rustproofing agent indicated below, when necessary, as dissolved in solvents such as water. In this case, the amount of the rustproofing agents to be used for the impregnation generally is in the range of 0.1 to 20 g, based on 100 g of the strand matrix.

The rustproofing agents usable herein include phosphinates, aminotrismethylene phosphoric acid, 1-hydroxyethylidene-1,1-diphosphonic acid, organic phosphoric esters, aminophosphates, phosphonium compounds, sarcosines, benzoates, oxycarboxylates, lignins, ligninsulfonates, polyacrylamide, 2,3-diemthyl-1-nitro-2-butene, p-aminobenzaldehyde, cinnamates, methylammonium-2,4-dinitrobenzoates, higher fatty acid salts, sodium succinate, sodium benzoacrylate, 2,3-dimethyl-1-nitro-2-butene, gluconates, n-lauroylsarcosine, n-coco-aminopropionic acid, 4-n-hexylcatechol, 4-n-butyl catechol, hexamethyleneimine nitrobenzoate, 3,5-dinitrosobenzoic acid piperidine, benzoates of amines, nitrites of amines, organic esters of nitrous acid, organic esters of thionitrous acid, dicyclohexyl ammonium nitrite, diisobutyl ammonium nitrite, diisopropyl ammonium nitrite, trimethylsulfonium nitrite, cyclohexylamine carbonates, monoethanol amine carbonates, mixtures of phosphonates with macromolecular electrolytes, calcium salts, zinc salts, magnesium salts, aluminum salts, various polyphosphates, various polysilicates, chromates, molybdenum chloride salts, tungsten oxide salts, pertechnetic acid salts, and lithium hydroxide salts, for example.

Figure 5:
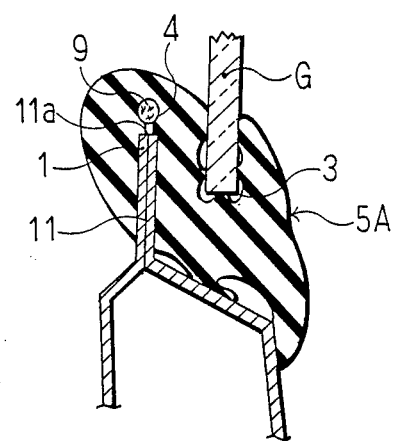
FIG. 5 is a cross section illustrating a typical window frame rubber molding as one embodiment of this invention already attached to an automobile body.

(3) The strand 9 impregnated with the rustproofing agents is set fast in the strand retaining groove 4 of the main body 5A of the window frame rubber molding (FIG. 5). Though this strand retaining groove 4 is converged in the direction of the opening thereof, the strand can be easily incorporated into the strand retaining groove 4 by causing the strand 9 to be slid into the groove 4 with the force exerted on the opposite ends of the strand 9 by hands in the direction of the bottom of the groove 4, for example, because the main body of window frame rubber molding is made of an elastomer material (4) The window frame rubber molding which has admitted the strand 9 impregnated with the rustproofing agents similarly to the conventional countertype, has a groove-spreading cord disposed in advance on the bottom part of the flange retaining groove 1, so that a glass sheet G will be fixed to the automobile body with the flange retaining groove 1 spread out to receive the automobile body flange 11. In this case, the possibility of the strand 9 impregnated with the rustproofing agents being drawn out of the strand retaining groove 4 by the pull given at the groove-spreading cord is totally nil because this strand 9 is located more on the bottom side than the groove-spreading cord.

When the window frame rubber molding already attached to the automobile body suffers moisture or water to seep into the flange retaining groove 1, the automobile body flange 11, specifically the leading end 11a of the flange particularly susceptible to rusting, is infallibly protected with the rustproofing agents because the strand 9 exudes the rustproofing agents as it absorbs the incoming water.

What is claimed is:

1. A window frame rubber molding for an automobile, comprising a main body incorporating therein an automobile body flange retaining groove and a glass retaining groove opening in mutually opposite directions and possessing an approximately S-shaped cross section, which window frame rubber molding is characterized by the fact that said flange retaining groove is provided in the bottom wall thereof with a strand retaining groove converted in the direction of the opening thereof and said strand retaining groove has fitted therein a strand impregnated with rustproofing agents, the amount of said rustproofing agents to be used for the impregnation of said strand being in the range of 0.1 to 20 g per 100 g of the matrix of said strand.

2. A window frame rubber molding according to claim 1, wherein said strand is in the form of felt or nonwoven fabric.

* * * * *